(12) United States Patent
Rubinstein et al.

(10) Patent No.: US 6,985,152 B2
(45) Date of Patent: Jan. 10, 2006

(54) POINT-TO-POINT BUS BRIDGING WITHOUT A BRIDGE CONTROLLER

(75) Inventors: Oren Rubinstein, Sunnyvale, CA (US); Jonah M. Alben, San Jose, CA (US); Wei-Je Huang, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/831,440

(22) Filed: Apr. 23, 2004

(65) Prior Publication Data
US 2005/0237327 A1    Oct. 27, 2005

(51) Int. Cl.
*G06F 13/14* (2006.01)
(52) U.S. Cl. .................. 345/520; 710/305; 345/502
(58) Field of Classification Search ........ 345/501–503, 345/519, 520; 710/100, 313, 300–302, 305–307, 710/312
See application file for complete search history.

(56) References Cited

U.S. PATENT DOCUMENTS

| | | | |
|---|---|---|---|
| 6,138,193 A * | 10/2000 | Dalton et al. .............. 710/301 |
| 6,141,021 A * | 10/2000 | Bickford et al. ............ 345/503 |
| 6,275,240 B1 * | 8/2001 | Riffault ...................... 345/503 |
| 6,292,859 B1 * | 9/2001 | Santiago ..................... 710/107 |
| 6,507,879 B1 * | 1/2003 | Sayles ........................ 710/104 |

* cited by examiner

*Primary Examiner*—Kee M. Tung
(74) *Attorney, Agent, or Firm*—Townsend and Townsend and Crew LLP

(57) ABSTRACT

A computer system includes an integrated graphics subsystem and a graphics connector for attaching either an auxiliary graphics subsystem or a loopback card. A first bus connection communicates data from the computer system to the integrated graphics subsystem. With a loopback card in place, data travels from the integrated graphics subsystem back to the computer system via a second bus connection. When the auxiliary graphics subsystem is attached, the integrated graphics subsystem operates in a data forwarding mode. Data is communicated to the integrated graphics subsystem via the first bus connection. The integrated graphics subsystem then forwards data to the auxiliary graphics subsystem. A portion of the second bus connection communicates data from the auxiliary graphics subsystem back to the computer system. The auxiliary graphics subsystem communicates display information back to the integrated graphics subsystem, where it is used to control a display device.

23 Claims, 5 Drawing Sheets

POINT-TO-POINT BUS BRIDGING WITHOUT A BRIDGE CONTROLLER

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate e the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Traditionally, the CPU and other chips implementing core logic functions of the computer system are located on a single circuit board, referred to as a motherboard. The graphics processing subsystem is located on a separate circuit board that is connected with the motherboard via an expansion slot interface. More recently, the graphics processing subsystem has been integrated into the motherboard, either as part of a chip implementing core logic functions of the computer system or as one or more separate graphics and/or memory chips. Integrating the graphics processing subsystem with the motherboard allows computer manufacturers to provide complete, low-cost computer systems. It also enables computer manufacturers to produce physically compact computer systems, such as notebook computers or other mobile computing applications.

Typically, integrated graphics processing subsystems have lower performance than graphics processing subsystems located on separate circuit boards, due to a number of factors. First, the physical size of the integrated graphics processing subsystem is limited to the available space on the motherboard. This may limit the complexity of the graphics processing chip or chips used as well as the amount of memory available for graphics operations. Second, power consumption and heat dissipation are more difficult to deal with in integrated graphics processing subsystems, especially with physically compact computer systems. Additionally, as integrated graphics processing subsystems are often intended to be part of low cost computer systems, cost considerations may limit graphics processing subsystem performance.

Computer owners may desire to upgrade the integrated graphics processing subsystem in their computer systems to improve performance or to stave off obsolescence. However, upgrading integrated graphics processing subsystems is difficult or impossible. As their name belies, many integrated graphics processing subsystems are literally physically incorporated into the motherboard of the computer system, and cannot be removed and upgraded without replacing the entire motherboard. This is either impossible or too cost-prohibitive to be an effective solution.

An alternate solution includes an expansion slot or port on the motherboard along with an integrated graphics processing subsystem. When the expansion slot is unused, the computer system uses the integrated graphics processing subsystem. When an auxiliary graphics processing subsystem is connected with the expansion slot or port, the integrated graphics processing subsystem is disabled and the auxiliary graphics processing subsystem performs the graphics operations for the computer system.

However, including an expansion slot or port for replacing an integrated graphics processing subsystem requires a graphics bus bridge circuit for alternately routing data to the integrated graphics processing subsystem or an additional graphics processing subsystem. A graphics bus bridge circuit is an expensive and complicated component. A graphics bus bridge circuit increases the cost of the motherboard due to a substantial increase in the complexity of the core logic, the quantity of chip pins, and the difficulties in arranging circuit board traces. These additional costs associated with a graphics bus bridge circuit spoil many of the advantages of integrated graphics processing subsystems.

It is therefore desirable for a system to enable upgrades to integrated graphics processing subsystems without adding expensive components to the computer system. It is further desirable that the system of upgrading integrated graphics processing subsystems be adaptable to a variety of different types of computer systems.

BRIEF SUMMARY OF THE INVENTION

An embodiment of the invention includes an integrated graphics subsystem and a graphics connector for attaching either an auxiliary graphics subsystem or a loopback card. A first bus connection communicates data from the computer system to the integrated graphics subsystem. With a loopback card in place, data travels from the integrated graphics subsystem back to the computer system via a second bus connection. When the auxiliary graphics subsystem is attached to the graphics connector, replacing the loopback card, the integrated graphics subsystem operates in a data forwarding mode. The computer system communicates data to the integrated graphics subsystem via the first bus connection. The integrated graphics subsystem then forwards data via a portion of the second bus connection to the auxiliary graphics subsystem. The remaining portion of the second bus connection is used to communicate data from the auxiliary graphics subsystem back to the computer system. In a further embodiment, the auxiliary graphics subsystem communicates display information back to the computer system. The integrated graphics subsystem, when operating in data forwarding mode, receives the display information and uses it to control a display device.

In an embodiment, a computer system includes a central processing unit, a computer core logic controller, an integrated graphics subsystem, a graphics connector, and a data communications bus. The computer core logic controller is adapted to coordinate communications over a data communications bus. The integrated graphics subsystem is adapted to generate display data in response to a set of rendering information. The graphics connector is adapted to communicate with an auxiliary graphics subsystem.

The data communications bus is connected with the computer core logic controller and includes a first bus connection adapted to communicate a set of rendering information from the computer core logic controller to the integrated graphics subsystem, a second bus connection adapted to communicate information between the integrated graphic subsystem and the graphics connector, and a third bus connection adapted to communicate information from the graphics connector to the computer core logic controller. The integrated graphics subsystem includes a normal operation mode adapted to communicate information to the computer core logic via the second bus connection and the third bus connection, and also includes a data forwarding mode adapted to communicate a set of rendering information received via the first bus connection with an auxiliary graphics subsystem via the second bus connection.

In another embodiment, the integrated graphics subsystem is adapted to operate in the data forwarding mode in response to the removal of a loopback card from the graphics connector. The loopback card is adapted to connect the second bus connection with the third bus connection. In a further embodiment, the loopback card is adapted to hold a portion of the data communications bus to a voltage value indicating the absence of an auxiliary graphics subsystem. A portion of the data communications bus may be a presence detect line adapted to indicate a connection between the graphics connector and an auxiliary graphics subsystem.

In yet another embodiment, the computer system includes a display device connected with the integrated graphics subsystem. The display device is adapted to receive display data from the integrated graphics subsystem. While operating in data forwarding mode, the integrated graphics subsystem is adapted to receive display data from the auxiliary graphics subsystem via the data communications bus.

BRIEF DESCRIPTION OF THE DRAWINGS

The invention will be described with reference to the drawings, in which.

In the drawings, identical reference numbers indicate like components.

DETAILED DESCRIPTION OF THE INVENTION

Figure 1:
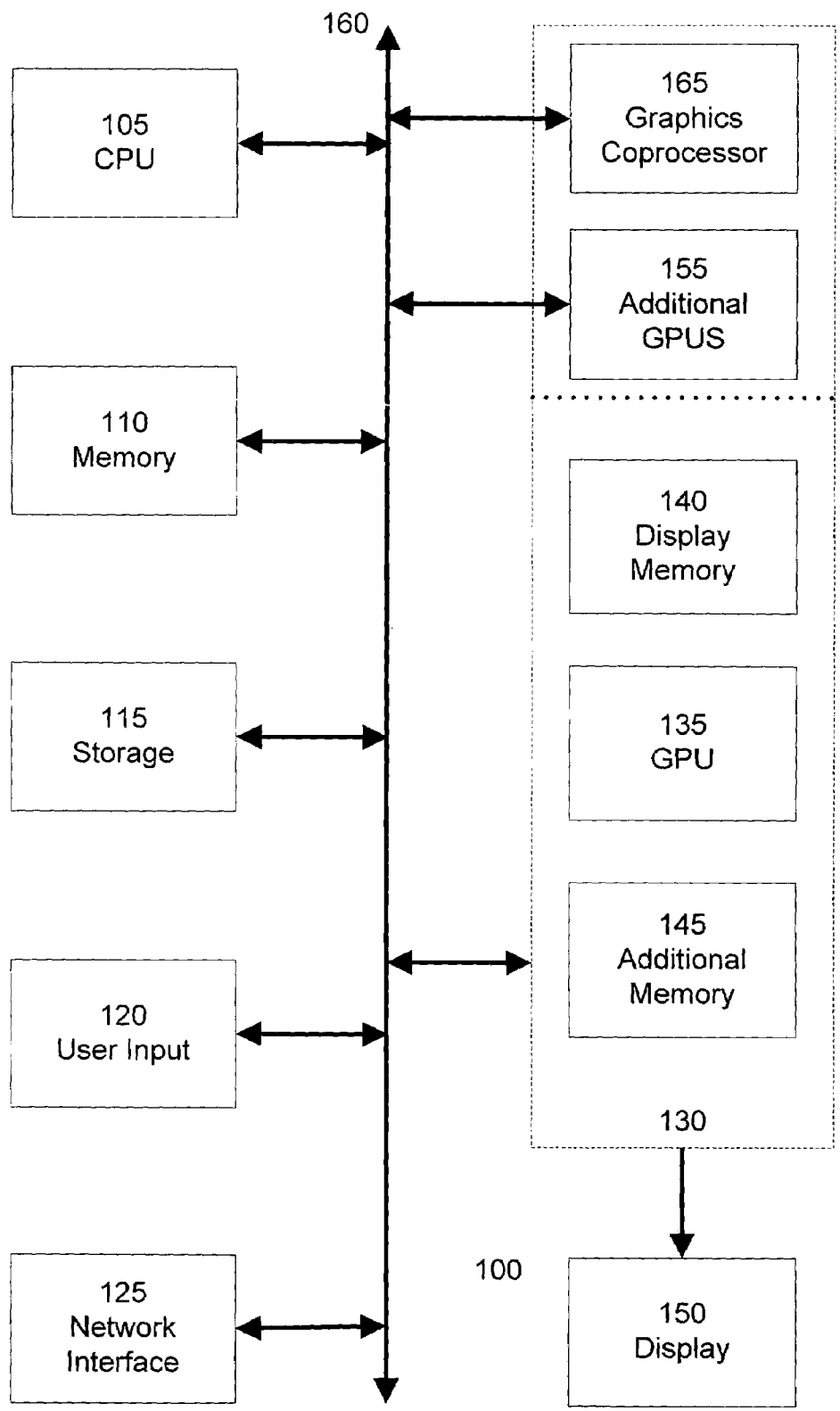
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-Express, and HyperTransport data buses.

A graphics subsystem 130 is further connected with data bus 160 and the components of the computer system 100. The graphics subsystem may be integrated with the computer system motherboard or on a separate circuit board fixedly or removably connected with the computer system. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135, or in place of GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2A:
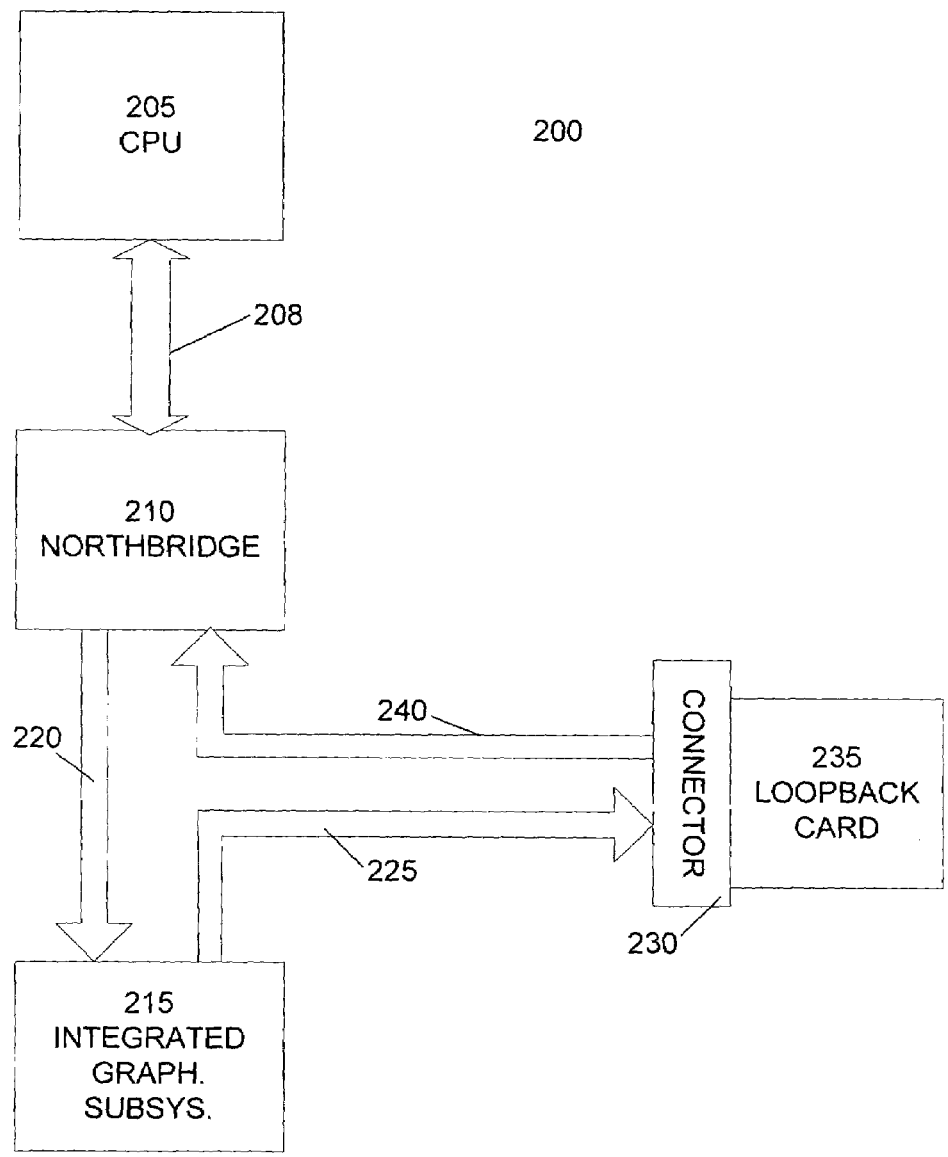
FIGS. 2A and 2B illustrate a computer system employing an integrated graphics processing subsystem or an auxiliary graphics processing subsystem according to an embodiment of the invention.
Figure 2B:
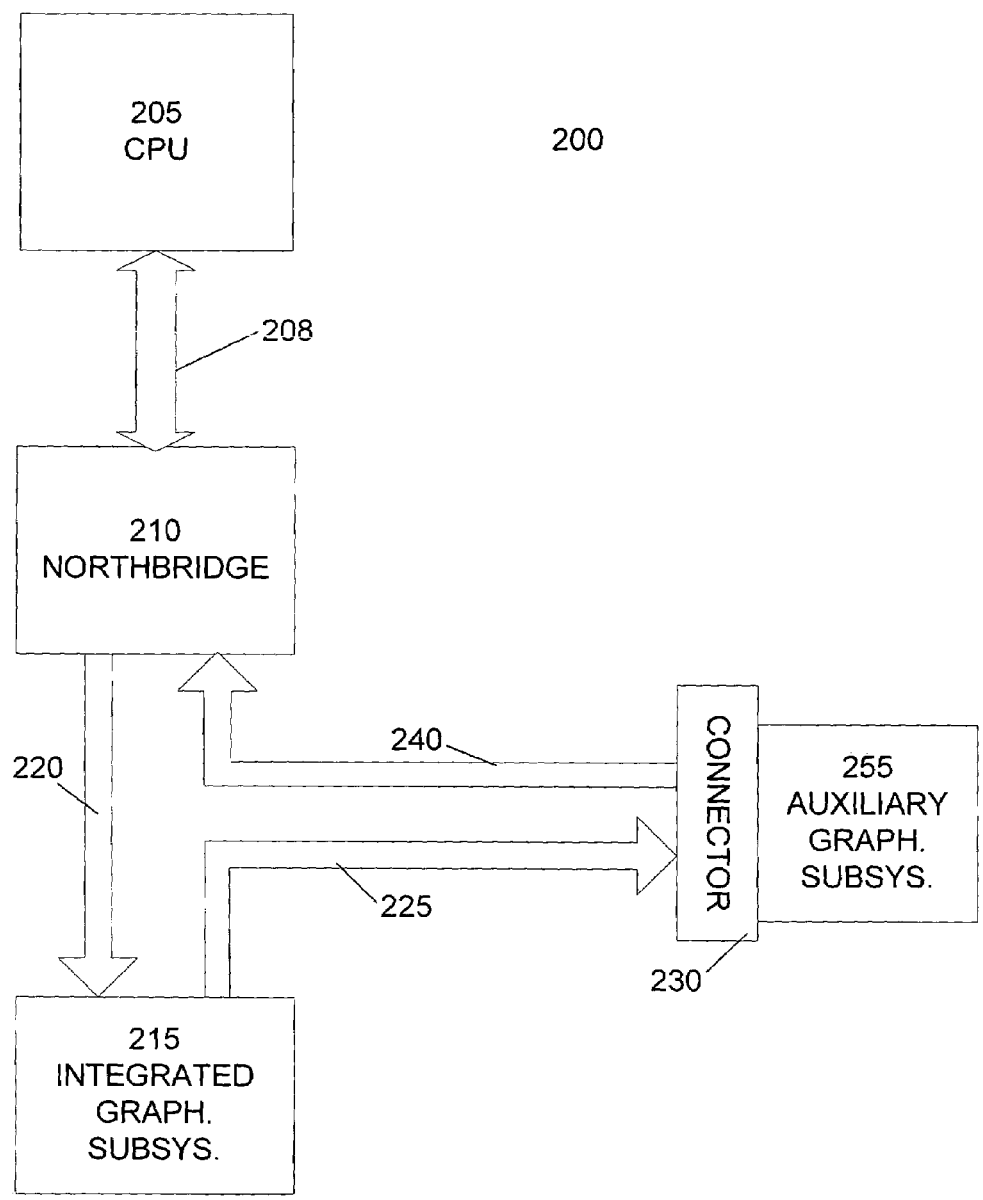

FIGS. 2A and 2B illustrate a computer system employing an integrated graphics processing subsystem or an auxiliary graphics processing subsystem according to an embodiment of the invention. FIG. 2A illustrates a computer system 200. The CPU 205 of the computer system is connected with Northbridge chip 210 via data bus 208. Northbridge chip 210 implements core logic functions of the computer system 200, including coordinating communications between the CPU 205 and the graphics processing subsystem. The Northbridge 210 may be a separate chip or integrated with the CPU 205. Computer system 200 include an integrated graphics subsystem 215. The integrated graphics subsystem 215 includes one or more graphics processing units and optionally separate graphics memory. As discussed above, the graphics processing subsystem 215, which may comprise one or more discrete chips, is integrated with the computer system. In an embodiment, the integrated graphics subsystem 215, the CPU 205, and the Northbridge 210 are all located on the motherboard of the computer system 200.

The integrated graphics subsystem 215 is connected with the Northbridge 210, and hence the CPU 205, via a data bus. In an embodiment, the data bus is a 16 bit wide PCI-Express data bus. An outbound data bus connection 220 is adapted to communicate data from Northbridge 210 to integrated graphics processing subsystem 215.

Conventional bus architectures typically include both outbound data bus connections between the Northbridge and the graphics processing subsystem, for communicating data to the graphics processing subsystem, and inbound data bus connections between the graphics processing subsystem and the Northbridge, for communicating data from the graphics processing subsystem to the Northbridge. However, computer system 200, in an embodiment of the invention, includes an inbound data bus connection 225 between the integrated graphics subsystem 215 and a graphics connector 230. Graphics connector 230 is adapted to connect with an auxiliary graphics subsystem, which can be used in place of the integrated graphics subsystem 215. Graphics connector 230 also includes an inbound data bus connection 240 to the Northbridge 210.

When an auxiliary graphics subsystem is not being used, a loopback card 235 is attached to the graphics connector 230. Loopback card 230 connects the inbound data bus connections 225 and 240 together. In an embodiment, loopback card 235 is a small circuit board with passive circuit traces for connecting the data lines of the inbound data bus connection 225 with their appropriate counterparts of inbound data bus connection 240. With loopback card 235 connected with the graphics connector 235, the combination of the inbound data bus connections 225 and 240 together form a complete return path for communicating data from the integrated graphics subsystem 215 to the Northbridge 210 As this embodiment of the loopback card 235 is a passive circuit component, it adds very little to the cost or complexity of the computer system 200.

FIG. 2B illustrates computer system 200 with an auxiliary graphics subsystem 255 connected. The loopback card 235 discussed above is removed from the graphics connector 230, and in its place, an auxiliary graphics subsystem 255 is connected. In an embodiment, graphics connector 230 may be an expansion slot adapted to connect with an auxiliary graphics subsystem 255 located on one or more separate circuit boards. The auxiliary graphics subsystem 255 may be adapted to fit within the case of the computer system 200, for example in desktop computer applications, or alternately reside outside the computer system 200 in its own housing, for example in notebook computer or mobile applications. The auxiliary graphics subsystem 255 may be connected with graphics connector 230 directly, for example as a circuit board adapted to fit within a graphics connector 230 in the form of an expansion slot, or via a cable or other electrical link adapted to connect with the graphics connector 230 in the form of a plug, socket, port, or other electrical connector. The auxiliary graphics subsystem 255 can rely on power connections provided by graphics connector 230 for sufficient power, or alternately include a separate power supply.

With the auxiliary graphics subsystem 255 in place, data, including rendering commands and data, are communicated from the CPU 205, through the Northbridge 210, through outbound data bus connection 220 to the integrated graphics subsystem 215. With the auxiliary graphics subsystem 255 connected, an embodiment of computer system 200 configures integrated graphics subsystem 215 to operate in a data forwarding mode. While in data forwarding mode, the integrated graphics subsystem 215 rebroadcasts data received via outbound data bus connection 220 to the auxiliary graphics subsystem 255 via inbound data bus connection 225. In this manner, using the data forwarding mode of the integrated graphics subsystem 215, data is communicated from the CPU 205 to the auxiliary graphics subsystem 255. Data is communicated from the auxiliary graphics subsystem 255 back to the Northbridge 210, and on to the CPU 205 if necessary, via inbound data bus connection 240.

The data forwarding mode of the integrated graphics subsystem 215 can be implemented in a number of different ways. The integrated graphics subsystem 215 receives analog voltage signals representing digital data via outbound bus connection 220. In an embodiment, the integrated graphics subsystem 215, when operating in data forwarding mode, internally switches the outbound data bus connection 220 to connect with the inbound data bus connection 225. By connecting the outbound data bus connection 220 with the inbound data bus connection 225, the analog voltage signals received on outbound data bus connection 220 are replicated on inbound data bus connection 225, so that auxiliary graphics subsystem 255 can receive these analog voltage signals and convert them into digital data.

In an alternate embodiment, the integrated graphics subsystem 215, when operating in data forwarding mode, internally converts the analog voltage signals received from the outbound data bus connection 220 to its corresponding digital data values. The digital data values are then converted back into analog voltage signal that is applied to the inbound data bus connection 225. The auxiliary graphics subsystem 255 receives these analog voltage signals generated by the integrated graphics subsystem 215 and converts them into digital data.

Regardless of whether the data forwarding mode of the integrated graphics subsystem 215 uses a fully analog or a combined analog/digital data path for communicating data from the Northbridge 210 to the auxiliary graphics subsystem 255, a further embodiment, the integrated graphics subsystem 215 also converts all of the received analog voltage signals into digital data values. The digital data values are then used by the integrated graphics subsystem 215 to operate specific features, for example switching between normal and data forwarding modes of operation, or, as discussed below, receiving display information used to control an integrated display.

In another embodiment, the computer system 200 automatically detects the removal of the loopback card 235 and the subsequent connection of the auxiliary graphics subsystem 255, and vice-versa. In this embodiment, the data bus connections 220, 225, and 240 all include one or more "presence detect" connections. For example, the PCI-Express data bus specification includes a presence detect connection, normally set to a high voltage value. When an auxiliary graphics subsystem 255 is connected with graphics connector 230, the presence detect connection is set to a different value, indicating that a new device is connected with the graphics connector 230. For example, the auxiliary graphics subsystem may ground the presence detect connection. In an embodiment, the auxiliary graphics subsystem 255 may be connected with the computer system 200 while the system 200 is running. Additionally, the auxiliary graphics subsystem 255 may be connected to the computer system 200 while it is off, and the auxiliary graphics subsystem 255 will then be detected the next time the computer system 200 is turned on.

In response to a change in the value of the presence detect connection, the Northbridge 210 signals to the computer system 200 that an auxiliary graphics subsystem 255 has been connected. In response, the computer system 200 performs various task to initialize the auxiliary graphics subsystem 255, such as allocating address space and loading appropriate device drivers. Additionally, the Northbridge 210 instructs the integrated graphics subsystem 215 to operate in data forwarding mode, discussed above, so that data can be communicated with the auxiliary graphics subsystem 255. In an embodiment, the Northbridge 210 communicates with the integrated graphics subsystem 215 using a sideband signal when the auxiliary graphics subsystem 255 is connected, to avoid a potential communications conflict.

A similar process is performed when the auxiliary graphics subsystem 255 is removed and replaced with a loopback card 235. The Northbridge 210 detects a change in the presence detect connections, indicating that the auxiliary graphics subsystem 255 has been removed and replaced with loopback card 235. In response, the Northbridge 210 instructs the integrated graphics subsystem 215 to operate in its normal, rather than data forwarding mode of operation. Additionally, any operating system resources used by the auxiliary graphics subsystem 255 are deallocated, and the appropriate resources for the integrated graphics subsystem 215, such as address space and device drivers, are initialized.

When adding an auxiliary graphics subsystem to a desktop computer system, the display device can often be connected via an external cable directly into a port on the auxiliary display device. However, in some types of computer systems, a display device is fixed connected with an integrated graphics subsystem. For example, in notebook computers and mobile devices, the display device is integrated with the computer system and the connection between the display device and computer system cannot be manually disconnected from the integrated graphics subsystem and reconnected with the auxiliary graphics subsystem.

Figure 3:
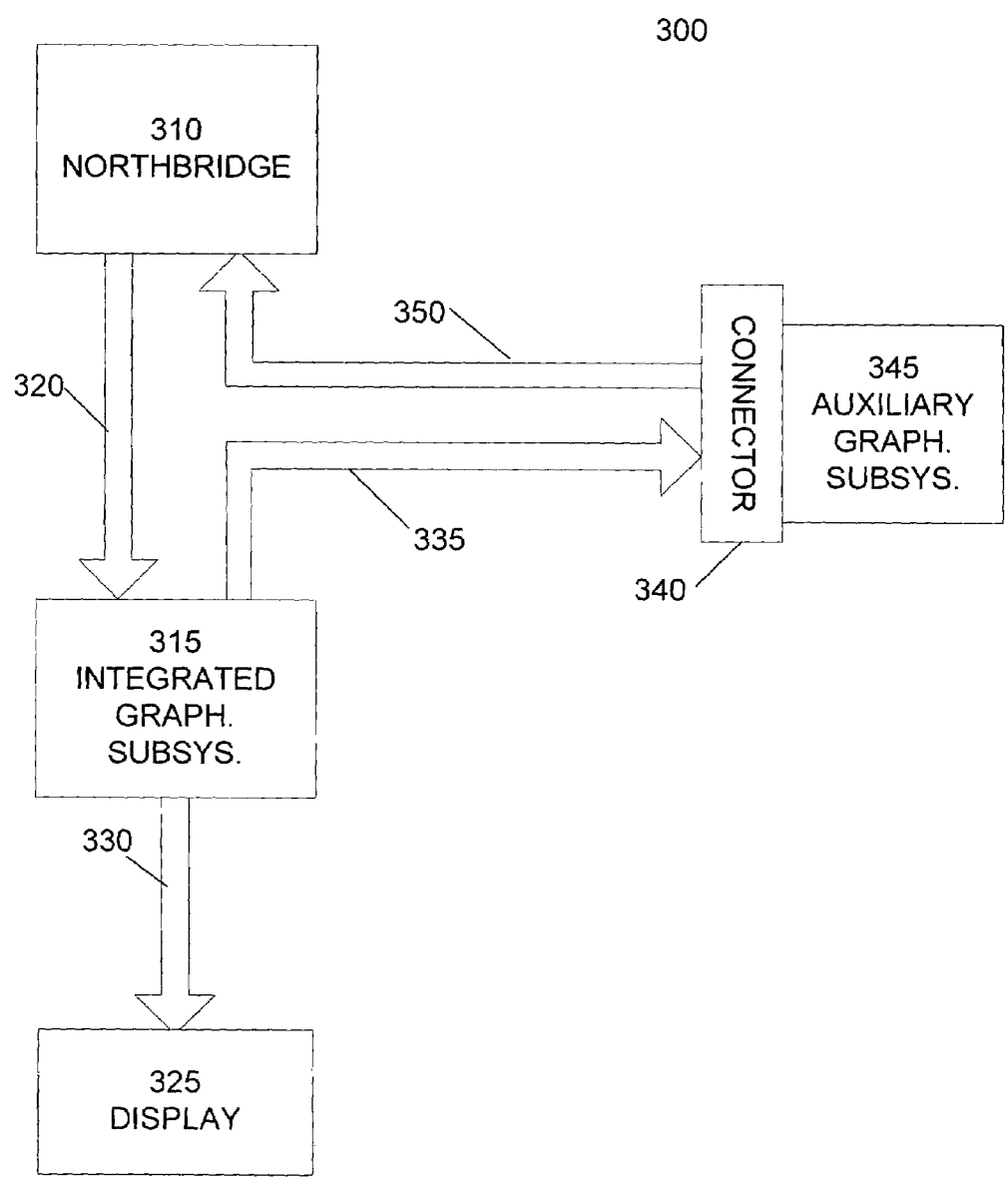
FIG. 3 illustrates the use of an auxiliary graphics processing subsystem in conjunction with an integrated graphics display device according to an embodiment of the invention.

In computer systems with integrated display devices, an embodiment of the invention communicates display information from the auxiliary graphics subsystem to the integrated display via the integrated graphics subsystem. FIG. 3 illustrates the use of an auxiliary graphics processing subsystem in conjunction with an integrated graphics display device according to an embodiment of the invention.

FIG. 3 illustrates a computer system 300 having an integrated display 325. For clarity, the CPU and other components shown in previous drawings have been omitted. Northbridge 310 implements core logic functions of the computer system 300, including coordinating communications between the CPU 205 and the graphics processing subsystem.

The integrated graphics subsystem 315 is connected with the Northbridge 210, and hence the CPU, via a data bus. In an embodiment, the data bus is a 16 bit wide PCI-Express data bus. An outbound data bus connection 320 is adapted to communicate data from Northbridge 310 to integrated graphics processing subsystems 315. Similar to the embodiments discussed above, when no auxiliary graphics subsystem is present, the integrated graphics processing subsystem 315 is also connected via inbound data bus connections 335 and 350 and a loopback card to Northbridge 310.

Integrated graphics subsystem 315 is also connected with a display device 325 via display connection 330. Display device 325 is adapted to receive display data from the integrated graphics subsystem 315 and to display one or more images as a result. Display data sent to the display device 325 may be in analog or digital form, and the display connection 330 may be a fixed or removable connection.

When an auxiliary graphics subsystem 345 is attached to graphics connector 340, the integrated graphics subsystem 315 is switched to a data forwarding mode so that the Northbridge 310 can communicate with the auxiliary graphics subsystem 345. However, the display device 325 remains connected with the integrated graphics subsystem 315 via display connection 330.

To allow the auxiliary graphics subsystem 345 to display images on the display device 325, an embodiment of auxiliary graphics subsystem 345 sends a duplicate request for all display memory accesses to the Northbridge 310 via inbound data bus connection 350. The Northbridge 310 repeats the display memory request over the outbound data bus connection 320 to integrated graphics subsystem 315. The integrated graphics subsystem 315 interprets the display memory request and updates a copy of the display memory accordingly. The copy of the display memory is accessible to the integrated graphics subsystem 315. The integrated graphics subsystem 315 then uses the information stored in the copy of the display memory to create display data for the display device 325.

Figure 4A:
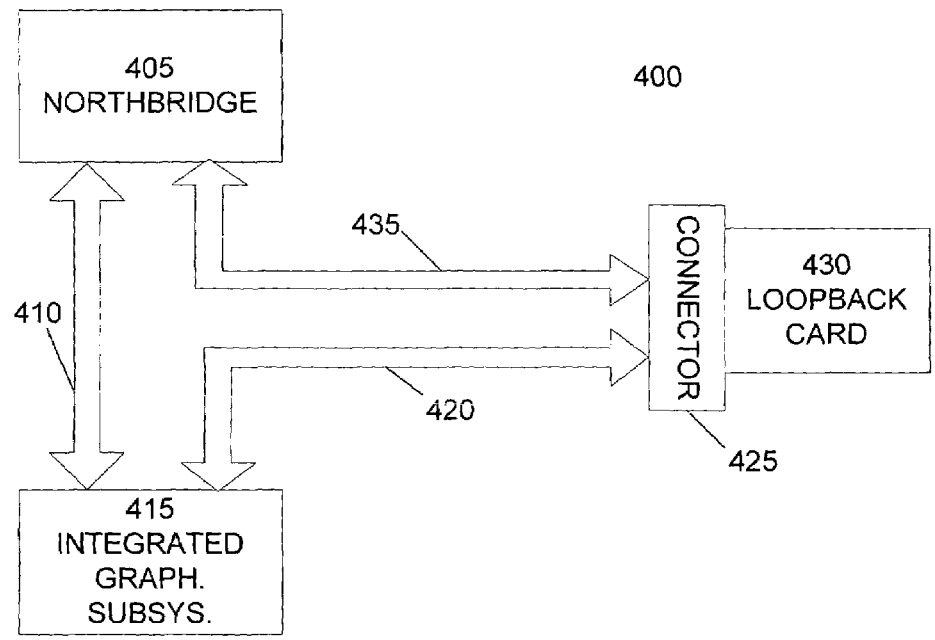
FIGS. 4A and 4B illustrate a computer system employing an integrated graphics processing subsystem or an auxiliary graphics processing subsystem according to another embodiment of the invention.
Figure 4B:
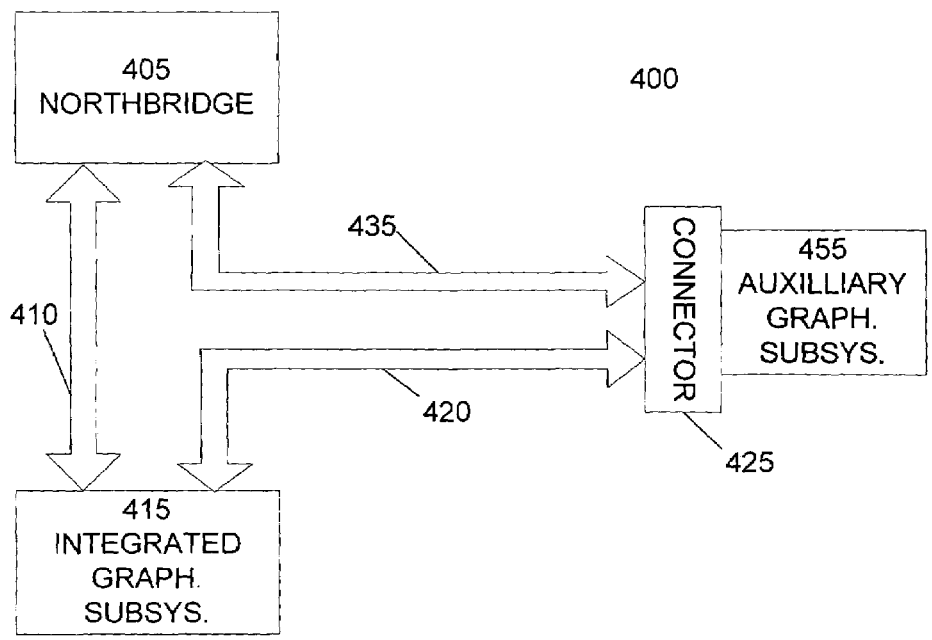

FIGS. 4A and 4B illustrate a computer system employing an integrated graphics processing subsystem or an auxiliary graphics processing subsystem according to another embodiment of the invention. Computer system includes a Northbridge 405 connected with an integrated graphics processing subsystem 415 and a graphics connector 425. In this embodiment, the data bus is split into two bus connections 410 and 435. For example, a 16 bit wide data bus is divided into two 8 bit wide connections. Bus connections 410 and 435 are each bi-directional connections capable of carrying data to and from the Northbridge 405.

Bus connection 410 is connected directly with the integrated graphics subsystem 415. A loopback card 430 is connected with graphics connector 425 when an auxiliary graphics subsystem is absent. The loopback card 430 bridges bus connection 435 to bus connection 420, which is connected with the integrated graphics subsystem 415. As discussed above, the loopback card 430 may be a passive circuit board. By bridging bus connections 435 and 420, the second bus connection 435 is connected with the integrated graphics subsystem 415. Together, with the presence of loopback card 430, bus connections 410 and 435 form a complete 16-bit wide data bus to the integrated graphics subsystem 415.

Data from the Northbridge 405 is divided into two portions, with the first portion traveling through bus connection 410 to the integrated graphics processing subsystem 415. The second portion of data from the Northbridge 405 travels via bus connection 435 to the graphics connector 425, through the loopback card 430, and then to the integrated graphics subsystem 415 via bus connection 420. Data from the integrated graphics subsystem 415 is communicated with the Northbridge 405 is a similar fashion. To compensate for transit delays introduced in communicating the second portion of data, an embodiment of the Northbridge 405 and the integrated graphics subsystem 415 both delay the first portion of data communicated over bus connection 410, thereby ensuring that the first and second portions of data remain synchronized.

FIG. 4B illustrates computer system 400 with an auxiliary graphics subsystem 455 attached. Auxiliary graphics subsystem 455 is attached to graphics connector 425 in place of the loopback card 430. In this configuration, the integrated graphics subsystem 415 operates in a data forwarding mode, as described above. Data is communicated from the Northbridge 405 to the auxiliary graphics subsystem 455 into two portions. The first portion travels through bus connection 410 to the integrated graphics processing subsystem 415. The integrated graphics processing subsystem 415 then redirects the first portion over bus connection 420 to the auxiliary graphics subsystem 455. As discussed above, the integrated graphics subsystem may use digital or analog systems for forwarding data from bus connection 410 to bus connection 420.

The second portion of data from the Northbridge 405 travels via bus connection 435 to the auxiliary graphics subsystem 455 directly. Data from the auxiliary graphics subsystem 455 is communicated with the Northbridge 405 is a similar fashion. In an embodiment, Northbridge 405 and the auxiliary graphics subsystem 455 both delay the second portion of data communicated over bus connection 435, thereby ensuring that the first and second portions of data remain synchronized.

This invention provides a system enabling upgrades to integrated graphics processing subsystems without adding expensive components such as data bus bridging circuits to the computer system. Although this invention has been discussed with reference to computer graphics subsystems, the invention is applicable to upgrading any type of integrated component of a computer system, including audio components and communications components. The invention has been discussed with respect to specific examples and embodiments thereof; however, these are merely illustrative, and not restrictive, of the invention. Thus, the scope of the invention is to be determined solely by the claims.

What is claimed is:

1. A computer system comprising:
    a central processing unit;
    a computer core logic controller adapted to coordinate communications over a data communications bus;
    an integrated graphics subsystem adapted to generate display data in response to a set of rendering information;
    a graphics connector adapted to communicate with an auxiliary graphics subsystem;
    a data communications bus connected with the computer core logic controller and including a first bus connection adapted to communicate a set of rendering information from the computer core logic controller to the integrated graphics subsystem, a second bus connection adapted to communicate information between the integrated graphics subsystem and the graphics connector, and a third bus connection adapted to communicate information from the graphics connector to the computer core logic controller;
    wherein the integrated graphics subsystem includes a normal operation mode adapted to communicate information to the computer core logic via the second bus connection and the third bus connection, and also includes a data forwarding mode adapted to communicate a set of rendering information received via the first bus connection with an auxiliary graphics subsystem via the second bus connection.

2. The computer system of claim 1, wherein the integrated graphics subsystem is adapted to operate in the data forwarding mode in response to the removal of a loopback card from the graphics connector.

3. The computer system of claim 2, wherein the loopback card is adapted to connect the second bus connection with the third bus connection.

4. The computer system of claim 3, wherein the loopback card is adapted to hold a portion of the data communications bus to a voltage value indicating the absence of an auxiliary graphics subsystem.

5. The computer system of claim 4, wherein the portion of the data communications bus is a presence detect line adapted to indicate a connection between the graphics connector and an auxiliary graphics subsystem.

6. The computer system of claim 1, further comprising a display device connected with the integrated graphics subsystem and adapted to receive display data from the integrated graphics subsystem;
    wherein, while operating in the data forwarding mode, the integrated graphics subsystem is adapted to receive display data from the auxiliary graphics subsystem via the data communications bus.

7. The computer system of claim 1, wherein the data communications bus is a PCI-Express bus.

8. A graphics processing unit adapted to be included in an integrated graphics subsystem of a computer system, comprising:
    a first data bus connection interface adapted to receive a set of rendering information from a first data bus connection; and
    a second data bus connection interface adapted to communicate information with a computer system via a second data bus connection;
    wherein the graphics processing unit includes a first mode of operation adapted to generate display data in response to a set of rendering information, and a second mode of operation adapted to forward a set of rendering information received via the first data bus connection interface to an auxiliary graphics processing subsystem via the second data bus connection interface.

9. The graphics processing unit of claim 8, wherein the graphics processing unit includes an analog connection between the first data bus connection interface and the second data bus connection interface, and wherein the analog connection is adapted to transfer an analog voltage signal representing rendering information and received via the first data bus connection interface to the second data bus connection interface.

10. The graphics processing unit of claim 8, wherein the graphics processing unit includes a digital connection between the first data bus connection interface and the second data bus connection interface, and wherein the digital connection is adapted to interpret an analog voltage signal representing rendering information and received via the first data bus connection interface into a digital signal and to convert the digital signal into an analog voltage signal to be output from the second data bus connection interface.

11. The graphics processing unit of claim 8, further including a display connection interface adapted to communicate display information to a display device, wherein, while operating in the second mode of operation, the graphics processing unit is adapted to receive display information from an auxiliary graphics subsystem via the first data bus connection interface.

12. The graphics processing unit of claim 8, further adapted to switch from the first mode of operation to the second mode of operation in response to receiving a command from the computer system, wherein the command is issued in response to an auxiliary graphics subsystem being connected with the computer system.

13. The graphics processing unit of claim 12, wherein the command is communicated via the first data bus communication interface.

14. The graphics processing unit of claim 12, wherein the command is communicated to the graphics processing unit in the form of a sideband signal.

15. The graphics processing unit of claim 8, wherein the first and second data bus connection interfaces are PCI-Express bus interfaces.

16. A computer core logic controller, comprising:
   a first data bus connection interface adapted to send a set of rendering information via a first data bus connection to an integrated graphics subsystem; and
   a second data bus connection interface adapted to receive information via a second data bus connection connected with a graphics connector;
   wherein the computer core logic controller is adapted to detect a connection between the graphics connector and an auxiliary graphics subsystem, and in response, to send a command to the integrated graphics subsystem indicating that the integrated graphics subsystem should forward the set of rendering information to the auxiliary graphics subsystem via a third data bus connection between the integrated graphics subsystem and the graphics connector.

17. The computer core logic controller of claim 16, further adapted to send the command to the integrated graphics subsystem via a sideband signal.

18. The computer core logic controller of claim 16, wherein the first and second data bus connection interfaces are PCI-Express bus interfaces.

19. The computer core logic controller of claim 16, further adapted to detect the connection between the graphics connector and an auxiliary graphics subsystem by detecting a change in a voltage value received by the second data bus connection interface on a portion of the second data bus connection, wherein the change in a voltage value is initiated by the removal of a loopback card from the graphics connector.

20. The computer core logic controller of claim 16, wherein the second data bus connection interface is adapted to receive information from an integrated graphics subsystem via a second data bus connection when a loopback card is connected with the graphics connector.

21. The computer core logic controller of claim 16, wherein the second data bus connection interface is adapted to receive information from an auxiliary graphics subsystem via a second data bus connection when an auxiliary graphics subsystem is connected with the graphics connector.

22. The computer core logic controller of claim 16, further adapted to receive display information from an auxiliary graphics subsystem via the second data bus connection interface and to communicate the display information to an integrated graphics subsystem via the first data bus connection interface.

23. The computer core logic controller of claim 16, wherein the computer core logic controller is part of a central processing unit.

\* \* \* \* \*